Patented May 17, 1927.

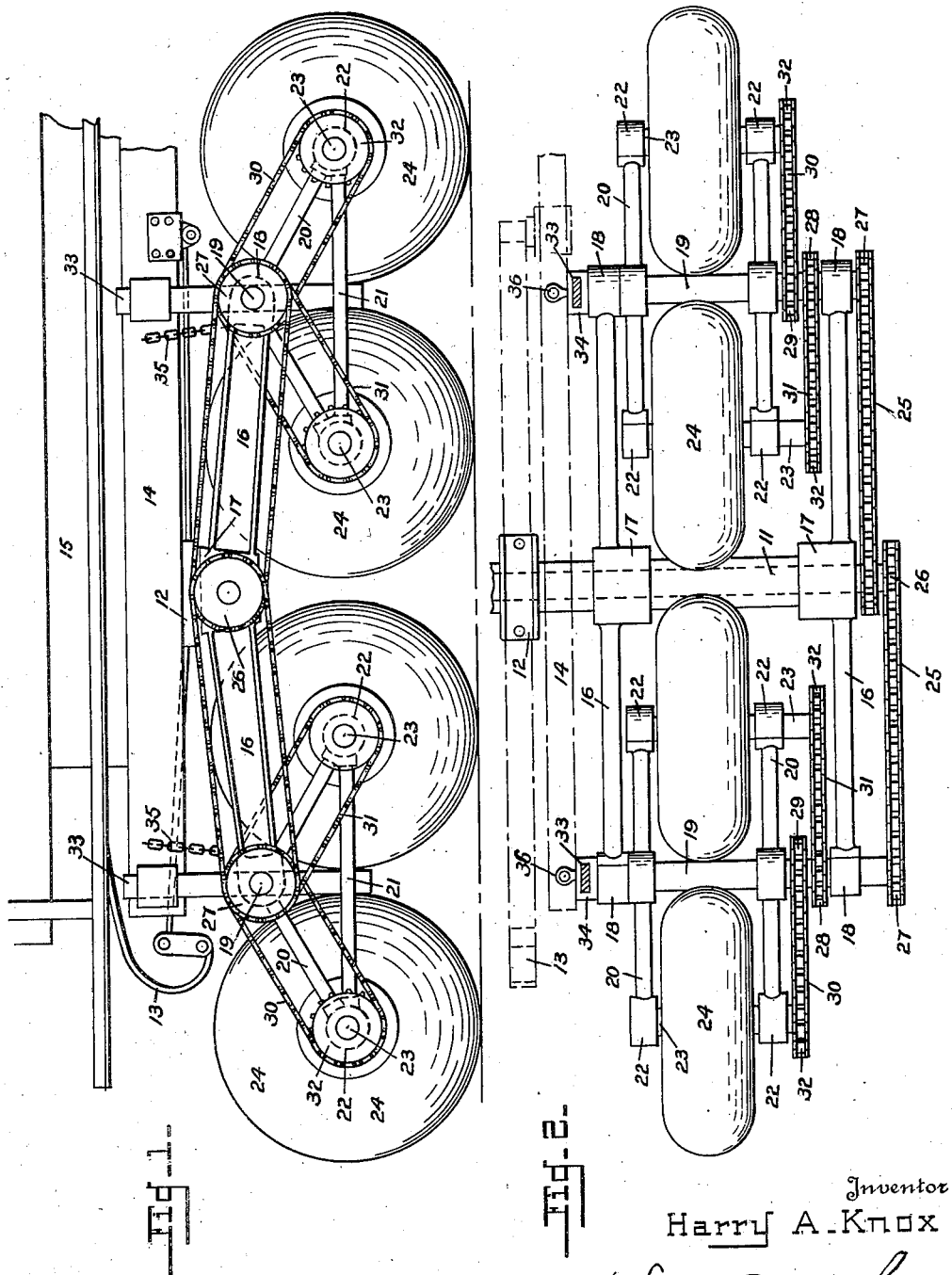

1,629,079

UNITED STATES PATENT OFFICE.

HARRY A. KNOX, OF DAVENPORT, IOWA.

TRACKLESS VEHICLE.

Application filed November 8, 1924. Serial No. 748,891.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a trackless vehicle.

In employing trackless vehicles for cross country traveling it has been proposed to specially equip the vehicle with additional wheels for the purpose of increasing the area of ground contact so that the unit ground pressure will be sufficiently low to support the vehicle under ordinary cross country conditions.

Obviously the unit pressure is proportional to the number of supporting wheels utilized and the present invention aims to provide a construction which will permit the largest practical number of either driving or supporting wheels. It is also apparent that because of the irregularities encountered in cross country running it is essential to yieldingly mount the wheels from the axle so that they may independently adjust themselves to any vertical position according to the character or contour of the road bed.

According to the invention there is provided a vehicle body yieldingly suspended on the rear axle which in turn is supported at either end by independent truck units having an oscillatory movement relative to the axle. Each truck unit consists of a plurality of groups of wheels arranged in series, each group including a pair of successive wheels mounted for independent oscillatory movement with respect to the other group.

To these and other ends my invention consists in the construction, arrangement, and combination of elements, described herein after and pointed out in the claims forming a part of this specification.

A practical embodiment of my invention is illustrated in the accompanying drawing, wherein:

Fig. 1 is a fragmentary view in side elevation of a motor vehicle equipped with running gear constructed in accordance with the invention; and Fig. 2 is a plan view of a truck unit showing the means for driving the wheels.

Referring to the drawings by numerals of reference:

In carrying out the invention there is provided a rear axle 11 having seats 12 for springs 13, which are connected to the main frame 14 and body 15 of the vehicle.

The axle is supported at either end by independent truck units, each unit comprising a main frame consisting of parallel beams 16—16 each being provided centrally with a bearing 17 by which it is mounted for oscillatory movement upon the axle 11. The beams are also provided with end bearings 18 in which are mounted bars or shafts 19 which serve to space the beams.

Pivotally mounted on the bars 19 are bogey frames 20 similar to the main frame 16—16 except on a diminutive scale and more sharply inclined. Inasmuch as the bogey frames 20 directly carry the load they are strengthened by a bar 21 between their end bearings 22 which support the axles 23 of the wheels 24. The wheels are preferably equipped with balloon tires of any conventional type.

It will be readily apparent that if desired the axles of the bogey frames might be made to similarly mount additional auxiliary frames thereby doubling the number of wheels in each truck unit.

The wheels may be driven through chains 25 from a double sprocket gear 26 mounted upon and driven by the power driven member of the axle 11. The driving power from the chains 25 is communicated through suitably connected sprockets 27, 28, and 29 mounted on the bars or shafts 19 on either side of the outer end bearings 18 to chains 30—31 which are trained on a sprocket 32 on each of the wheel axles 23.

The truck unit is guided and limited in its oscillatory movement by means of pilots 33 depending from the frame 14 and passing through apertures in projections 34 on the inner end bearings 18. Chains 35 attached to the frame 14 and secured to eyes 36 on the projections 34 are also provided for limiting the drop of each end of the main frame 16—16.

When an obstruction is encountered the foremost wheel of a truck unit is free to be moved angularly upward to follow the obstruction, this movement swinging the bogey frame about the bar 19 and causing either downward pressure or downward movement of the rear wheel of its group according to the nature of the obstruction. When the foremost group is on the incline a similar action will be conveyed through the main frame 16—16 to the succeeding group or groups, depending on the number of groups in a truck unit. When the foremost wheel or groups passes over the crest of the obstruction the bogey or main truck frame, as the case may be, is free to swing in the opposite direction thereby reversing the direction of vertical movement of the wheels and enabling each wheel of each group to at all times be in contact with the road.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A truck unit for motor vehicles embodying a main frame adapted to be centrally pivoted on an end of the vehicle axle, auxiliary frames centrally pivoted on the ends of the main frame, wheels mounted successively on the auxiliary frames, and means for driving the wheels.

2. A truck unit for motor vehicles embodying a main frame adapted to be centrally pivoted on an end of the vehicle axle, a plurality of successive groups of wheels independently hung from said frame for oscillatory movement, and means for driving the wheels.

3. A truck unit for motor vehicles embodying a main frame adapted to be centrally pivoted on an end of the vehicle axle, a plurality of successive groups of wheels independently hung from said frame, and means for driving the wheels.

4. A truck unit for motor vehicles embodying a main frame adapted to be centrally pivoted on an end of the vehicle axle, a plurality of groups of wheels independently hung from each end of the frame, and means for driving the wheels.

HARRY A. KNOX.